United States Patent
Berghegger

(10) Patent No.: US 8,467,201 B2
(45) Date of Patent: Jun. 18, 2013

(54) SIMPLIFIED PRIMARY TRIGGERING CIRCUIT FOR THE SWITCH IN A SWITCHED-MODE POWER SUPPLY

(75) Inventor: Ralf Schröder Genannt Berghegger, Glandorf (DE)

(73) Assignee: Flextronics GmbH & Co KG (DE)

( * ) Notice: Subject to any disclaimer, the term of this patent is extended or adjusted under 35 U.S.C. 154(b) by 846 days.

(21) Appl. No.: 12/523,145

(22) PCT Filed: Jan. 11, 2008

(86) PCT No.: PCT/EP2008/000204
§ 371 (c)(1),
(2), (4) Date: Dec. 16, 2009

(87) PCT Pub. No.: WO2008/086985
PCT Pub. Date: Jul. 24, 2008

(65) Prior Publication Data
US 2010/0142230 A1 Jun. 10, 2010

(30) Foreign Application Priority Data
Jan. 16, 2007 (DE) .......................... 10 2007 002 342

(51) Int. Cl.
*H02M 3/335* (2006.01)
(52) U.S. Cl.
USPC ........................................ 363/21.08; 363/20
(58) Field of Classification Search
USPC ..................... 363/16, 20, 21.01, 21.04, 21.05, 363/21.08, 21.1, 95, 97
See application file for complete search history.

(56) References Cited

U.S. PATENT DOCUMENTS

| | | | |
|---|---|---|---|
| 4,273,406 A | 6/1981 | Okagami | |
| 4,370,703 A | 1/1983 | Risberg | |
| 4,563,731 A | 1/1986 | Sato et al. | |
| 4,645,278 A | 2/1987 | Yevak et al. | |
| 4,712,160 A | 12/1987 | Sato et al. | |
| 4,788,626 A | 11/1988 | Neidig et al. | |
| 4,806,110 A | 2/1989 | Lindeman | |

(Continued)

FOREIGN PATENT DOCUMENTS
JP 4217869 A 8/1992
JP 10243640 A 9/1998
(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Matthew Nguyen
(74) *Attorney, Agent, or Firm* — Haverstock & Owens LLP

(57) ABSTRACT

The present invention relates to a trigger circuit for a switch in a switching power supply, especially in a primary-side, triggered switching power supply. The trigger circuit here comprises a feedback signal terminal for detecting an auxiliary voltage induced on a primary-side auxiliary winding of a transformer of the switching power supply, a supply voltage terminal for supplying the trigger circuit with a supply voltage, and a ground terminal for connecting the trigger circuit to a ground potential, wherein the feedback signal terminal is formed by the supply voltage terminal and the auxiliary voltage is superimposed on the supply voltage. Alternatively, the voltage of the auxiliary winding could be superimposed on the voltage on an additional pin that is used for detecting the primary peak current.

21 Claims, 18 Drawing Sheets

U.S. PATENT DOCUMENTS

Figure 1:
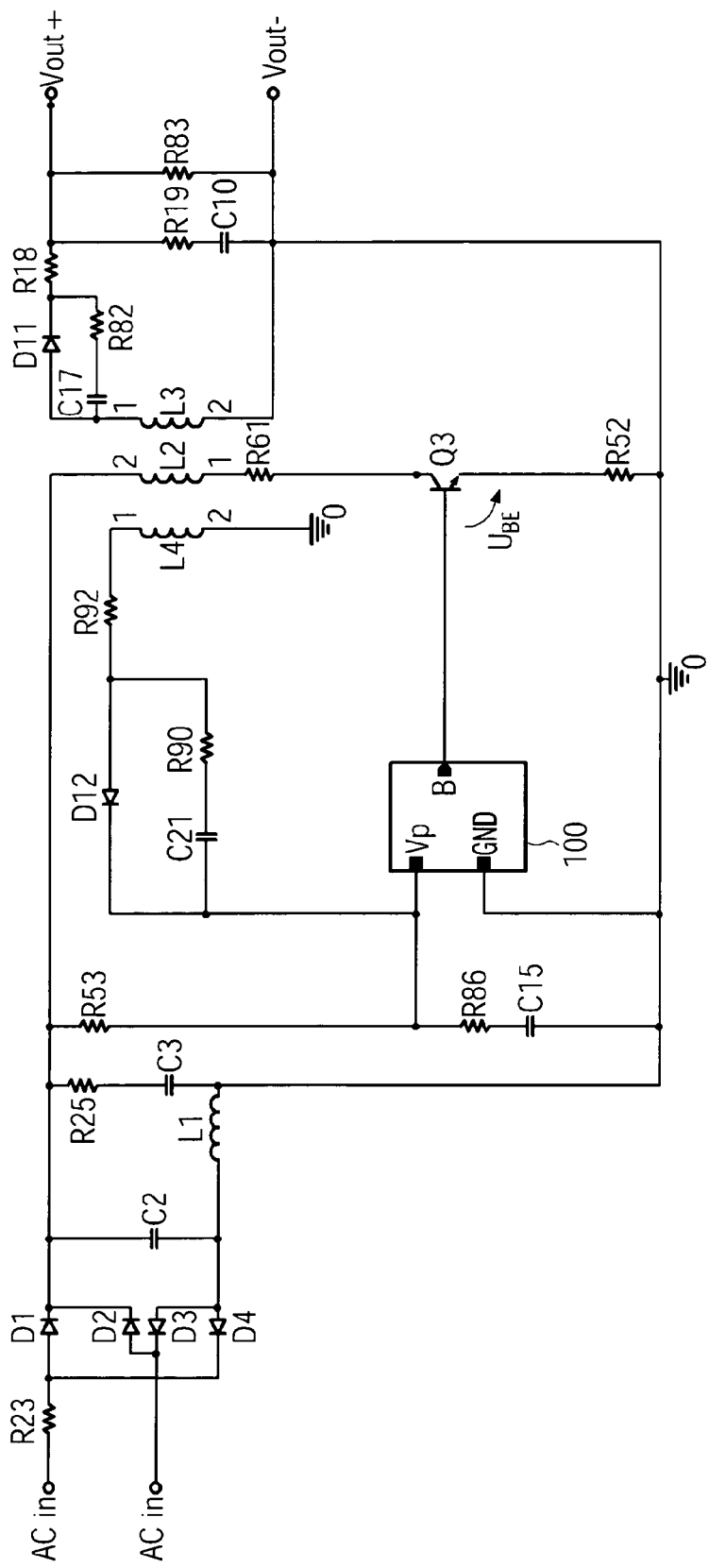

| | | | |
|---|---|---|---|
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | |
| 4,899,256 A | 2/1990 | Sway-Tin | |
| 4,901,069 A | 2/1990 | Veneruso | |
| 5,065,302 A | 11/1991 | Kanazawa | |
| 5,090,919 A | 2/1992 | Tsuji | |
| 5,101,322 A | 3/1992 | Ghaem et al. | |
| 5,132,890 A | 7/1992 | Blandino | |
| 5,235,491 A | 8/1993 | Weiss | |
| 5,325,283 A | 6/1994 | Farrington | |
| 5,365,403 A | 11/1994 | Vinciarelli et al. | |
| 5,373,432 A | 12/1994 | Vollin | |
| 5,442,540 A | 8/1995 | Hua | |
| 5,673,185 A | 9/1997 | Albach et al. | |
| 5,712,772 A | 1/1998 | Telefus et al. | |
| 5,786,992 A | 7/1998 | Vinciarelli et al. | |
| 5,790,395 A | 8/1998 | Hagen | |
| 5,811,895 A | 9/1998 | Suzuki et al. | |
| 5,838,554 A | 11/1998 | Lanni | |
| 5,859,771 A | 1/1999 | Kniegl | |
| 5,923,543 A | 7/1999 | Choi | |
| 5,949,672 A | 9/1999 | Bernet | |
| 6,009,008 A | 12/1999 | Pelly | |
| 6,091,611 A | 7/2000 | Lanni | |
| 6,183,302 B1 | 2/2001 | Daikuhara et al. | |
| 6,272,015 B1 | 8/2001 | Mangtani | |
| 6,275,397 B1 | 8/2001 | McClain | |
| 6,307,761 B1 | 10/2001 | Nakagawa | |
| 6,323,627 B1 | 11/2001 | Schmiederer et al. | |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,452,816 B2 | 9/2002 | Kuranuki | |
| 6,459,175 B1 | 10/2002 | Potega | |
| 6,487,098 B2 | 11/2002 | Malik et al. | |
| 6,549,409 B1 | 4/2003 | Saxelby et al. | |
| 6,578,253 B1 | 6/2003 | Herbert | |
| 6,721,192 B1* | 4/2004 | Yang et al. | 363/21.18 |
| 6,775,162 B2 | 8/2004 | Mihai et al. | |
| 6,894,461 B1 | 5/2005 | Hack et al. | |
| 6,919,715 B2 | 7/2005 | Muratov et al. | |
| 6,989,997 B2 | 1/2006 | Xu | |
| 7,035,126 B1 | 4/2006 | Lanni | |
| 7,038,406 B2 | 5/2006 | Wilson | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,239,532 B1* | 7/2007 | Hsu et al. | 363/21.12 |
| 7,274,175 B2 | 9/2007 | Manolescu | |
| 7,386,286 B2 | 6/2008 | Petrovic et al. | |
| 7,450,388 B2 | 11/2008 | Beihoff et al. | |
| 7,499,301 B2 | 3/2009 | Zhou | |
| 7,545,256 B2 | 6/2009 | O'Toole et al. | |
| 7,564,706 B1 | 7/2009 | Herbert | |
| 7,596,007 B2 | 9/2009 | Phadke | |
| 7,701,305 B2 | 4/2010 | Lin et al. | |
| 8,102,678 B2 | 1/2012 | Jungreis | |
| 2002/0008963 A1 | 1/2002 | Dibene, II et al. | |
| 2002/0011823 A1 | 1/2002 | Lee | |
| 2002/0036200 A1 | 3/2002 | Ulrich et al. | |
| 2003/0035303 A1 | 2/2003 | Balakrishnan et al. | |
| 2004/0183510 A1 | 9/2004 | Sutardja et al. | |
| 2004/0252529 A1 | 12/2004 | Huber et al. | |
| 2005/0024016 A1 | 2/2005 | Breen et al. | |
| 2005/0036338 A1 | 2/2005 | Porter et al. | |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0254268 A1* | 11/2005 | Reinhard et al. | 363/20 |
| 2006/0002155 A1 | 1/2006 | Shteynberg et al. | |
| 2006/0022637 A1 | 2/2006 | Wang et al. | |
| 2006/0152947 A1 | 7/2006 | Baker et al. | |
| 2006/0213890 A1 | 9/2006 | Kooken et al. | |
| 2007/0040516 A1 | 2/2007 | Chen | |
| 2007/0138971 A1 | 6/2007 | Chen | |
| 2007/0247091 A1 | 10/2007 | Maiocchi | |
| 2007/0263415 A1 | 11/2007 | Jansen et al. | |
| 2008/0043496 A1 | 2/2008 | Yang | |
| 2008/0191667 A1 | 8/2008 | Kernahan et al. | |
| 2009/0045889 A1 | 2/2009 | Goergen et al. | |
| 2009/0290384 A1 | 11/2009 | Jungreis | |
| 2009/0290385 A1 | 11/2009 | Jungreis et al. | |
| 2010/0039833 A1* | 2/2010 | Coulson et al. | 363/21.05 |
| 2010/0289466 A1 | 11/2010 | Telefus et al. | |
| 2010/0322441 A1 | 12/2010 | Weiss et al. | |
| 2011/0261590 A1 | 10/2011 | Liu | |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

EE Times.com—"Wireless Beacon Could recharge Consumer Devices", by R. Colin Johnson, 3 pages, Nov. 6, 2007.

Hang-Seok Choi et al., Novel Zero Voltage and Zero-Current-Switching (ZVZCS) Full-Bridge PWM Converter Using Coupled Output Inductor, Sep. 2002 IEEE, pp. 641-648.

"N, Massachusetts Institute of Technology, Room 10-171, Cambridge, MA 02139, pp. 4074-4084.ew Architectures for Radio-Frequency dc/dc Power Conversion", Juan Rivas et al., Laboratory for Electromagnetic and Electronic Systems, Jan. 2004.

"Randomized Modulation in Power Electronic Converters", Aleksander M. Stankovic, member IEEE, and Hanoch Lev-Ari, No. 5 May 2002, pp. 782-799.

"Analysis and Special Characteristics of a Spread-Spectrum Technique for Conducted EMI Suppression", K.K. Tse, et al. member IEEE, IEEE Transactions on Power Electronics, vol. 15.,No. 2, Mar. 2000, pp. 399-410.

* cited by examiner

SIMPLIFIED PRIMARY TRIGGERING CIRCUIT FOR THE SWITCH IN A SWITCHED-MODE POWER SUPPLY

FIELD OF THE INVENTION

The present invention relates to a trigger circuit for a switch in a switching power supply, especially in a primary-side, triggered switching power supply.

BACKGROUND OF THE INVENTION

Switching power supplies are used in numerous electronic devices to generate the low DC voltage required to supply the electronic components with power from a line voltage. Here, in many applications, switching power supplies have become popular compared with conventional line supply circuits with power transformers because they provide better efficiency above a certain power class, and in particular they have smaller space requirements. This is because, instead of using the line voltage, a high-frequency AC voltage is transformed, which can be in the frequency range of 20 kHz to 200 kHz, for example, instead of the 50 Hz or 60 Hz of the line voltage. Because the required number of transformer windings decreases in inverse proportion to the frequency, the $I^2R$ losses can be greatly reduced and the actual transformer becomes significantly smaller.

Such switching power supplies have a primary side and a secondary side, wherein the transformer has a primary-side winding and a secondary-side winding. A primary-side switch is connected to the primary-side winding in order to interrupt a flow of current through the primary-side winding, and the switching power supply has a free-running circuit for generating switching pulses that trigger the primary-side switch.

In order to optimize the degree of efficiency, in particular, primary-switched switching power supplies are known in which the frequency generated on the primary side of the high-frequency transformer by the switch, for example, a bipolar transistor, is regulated as a function of the load applied to the secondary side of the line voltage supply circuit in order to regulate the transmitted power. The feedback required for such regulation is realized in an especially simple way, such that an additional, primary-side auxiliary winding is arranged on the transducer, wherein an indicated voltage is generated by this auxiliary winding and wherein this indicated voltage indicates the voltage to be regulated on the secondary side with the aid of the auxiliary winding on the primary side. The voltage tapped on the auxiliary winding can then be used as a regulating parameter. The known regulating circuits, however, are usually either relatively expensive in terms of components or demand tight tolerances of the electronic components that are used, in order to achieve the necessary regulating accuracies.

Therefore, the problem of the present invention is to disclose a trigger circuit for the switch in a switching power supply and also a corresponding switching power supply that allows, with reduced complexity and relatively wide tolerances in the electronic components that are used, improved regulation characteristics and increased flexibility with respect to the operating parameters.

BRIEF SUMMARY OF THE INVENTION

This problem is solved by a trigger circuit with the features of the independent claims. Advantageous refinements of the present invention are the subject matter of the subordinate claims.

Here, the present invention is based on the idea of performing the required detection of the demagnetization of the transformer not on a separate auxiliary voltage input, but instead either on the supply voltage regulating input or on the peak current detection input. A signal required for detecting the demagnetization is then superimposed on the voltage on the supply voltage input or the peak current detection input. This can be realized in a simple way by means of one or more resistors and/or capacitors.

Through the detection according to the invention of the demagnetization on the supply voltage regulation input or peak current detection input, either a constant secondary duty factor or the so-called critical conduction mode can be set. In this way, the output current of the switching power supply becomes independent of internal timing elements in the integrated trigger circuit. For the detection of the demagnetization on the supply voltage input, the trigger circuit for the switch in a switching power supply could be configured so that it could be housed in a housing with only three terminals. The trigger circuit according to the invention here guarantees both output current limitation and also output voltage limitation and overvoltage protection.

The alternative embodiment in which the demagnetization of the transformer is detected on the peak current detection input allows improved functionality of the trigger circuit and realization in a 4-pin housing. Both variants have the particular advantage that they allow satisfactory tolerances for the output characteristic curve of the device despite relatively wide tolerances for the integrated resistors and capacitors.

In the trigger circuit according to the invention, the voltage regulation is performed with reference to the operating voltage of the trigger circuit. This is obtained from the blocking voltage of the transformer. Thus, it is proportional to the output voltage, and the primary-side switching transistor is turned off when the operating voltage exceeds a fixed limit value until it again falls below the limit value.

According to one advantageous embodiment of the present invention, the voltage on an auxiliary winding of the transformer is superimposed on the operating voltage of the trigger circuit by means of a capacitor and optionally one or more resistors. In this way, the zero-crossing of the voltage on the winding can be detected in the trigger circuit. Because this corresponds approximately to the time at which current no longer flows in the transformer, from this, either the time at which the switching transistor is again turned on or the period of the current flow can be determined, so that a constant secondary duty factor can be set. The circuit according to the invention is distinguished primarily by lower costs and reduced external wiring.

Alternatively, the voltage on the auxiliary winding can be superimposed on the voltage on an additional pin that is used for detecting the primary maximum current (frequently also called "peak current"). Thus, the zero-crossing on this terminal can now be determined. Otherwise, the functioning is the same as in the first embodiment. The advantage of the second embodiment consists primarily of the significantly more precise current regulation, somewhat more precise voltage regulation, and simplified detection of the zero-crossing of the voltage on the winding, because an additional signal is superimposed on the regulating voltage.

According to another advantageous embodiment of the present invention, the detection of the primary peak current is performed, as in the 3-pin variant, on the driver output (pin B), and the fourth pin (Ip) is used for the detection of demagnetization and simultaneously for the adaptation of the deactivation threshold for the primary peak current as a function of the input voltage. This variant indeed has the disadvantage that the primary peak current deactivation has the accuracy of just the 3-pin variant, but offers the advantage that the detection of the demagnetization is significantly simpler. In addition, the output current can be set without additional components, so that it is nearly input-voltage independent for one output voltage.

Another improvement is possible through the use of an Ip threshold that is dependent on the supply voltage Vp instead of the fixed reference voltage. If the deactivation threshold for the primary peak current for a low voltage at Vp (corresponding to a low output voltage) is less than for a large voltage at Vp, the output current decreases for a small output voltage in relationship to the current for a large output voltage. The output current is thus advantageously less output-voltage dependent.

BRIEF DESCRIPTION OF THE SEVERAL VIEWS OF THE DRAWING(S)

The invention will be explained in greater detail below with reference to the configurations shown in the accompanying drawings. Similar or corresponding details are provided with the same reference symbols in the figures.

Figure 2:
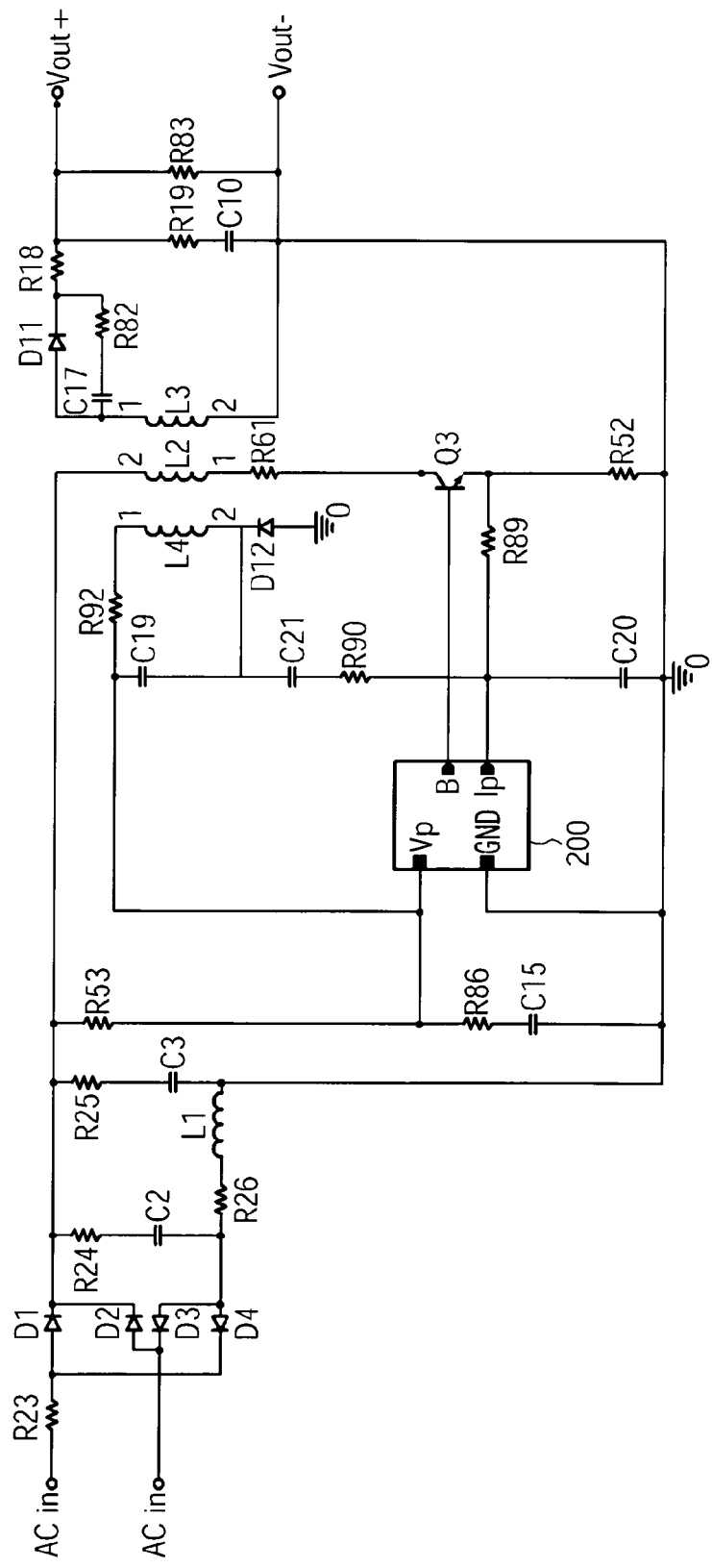
Figure 3:
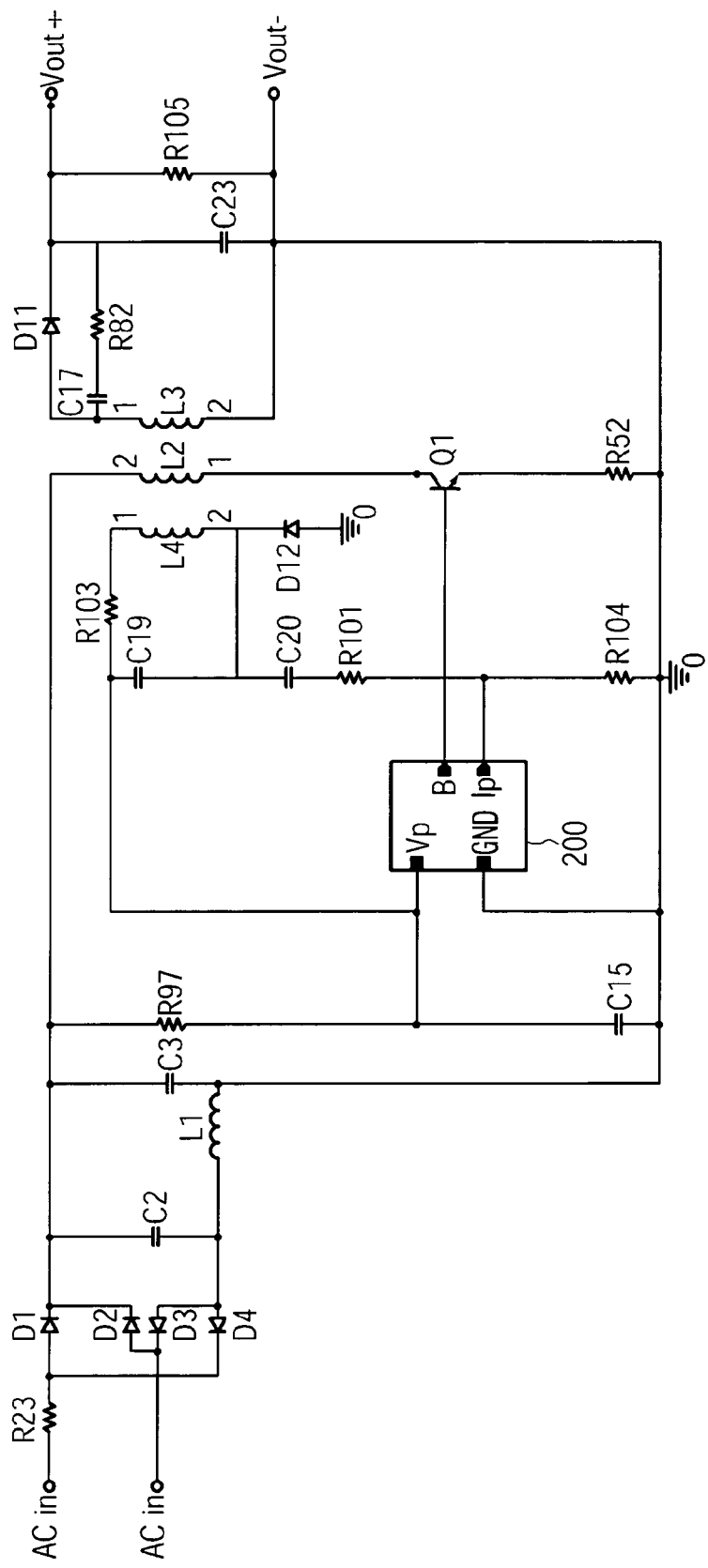
Figure 4:
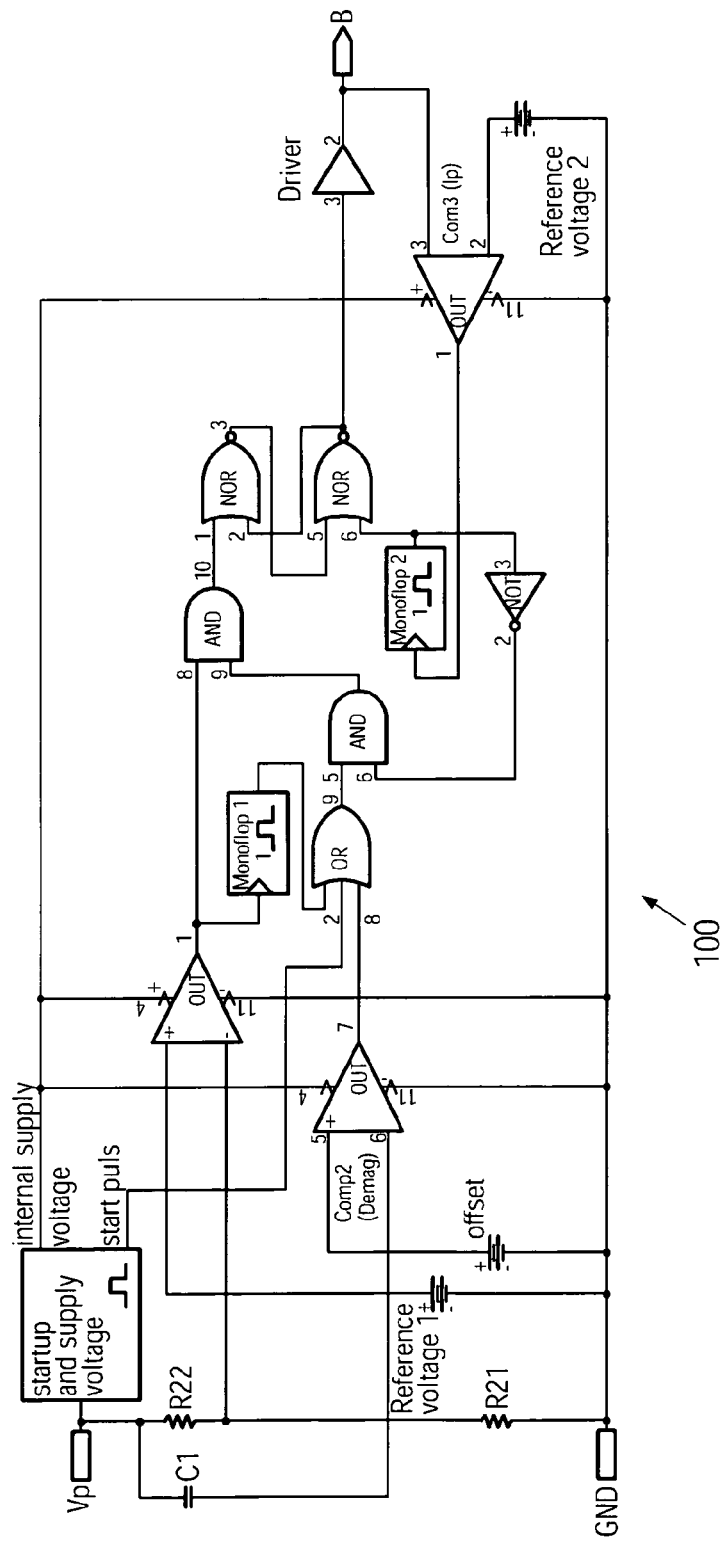
Figure 5:
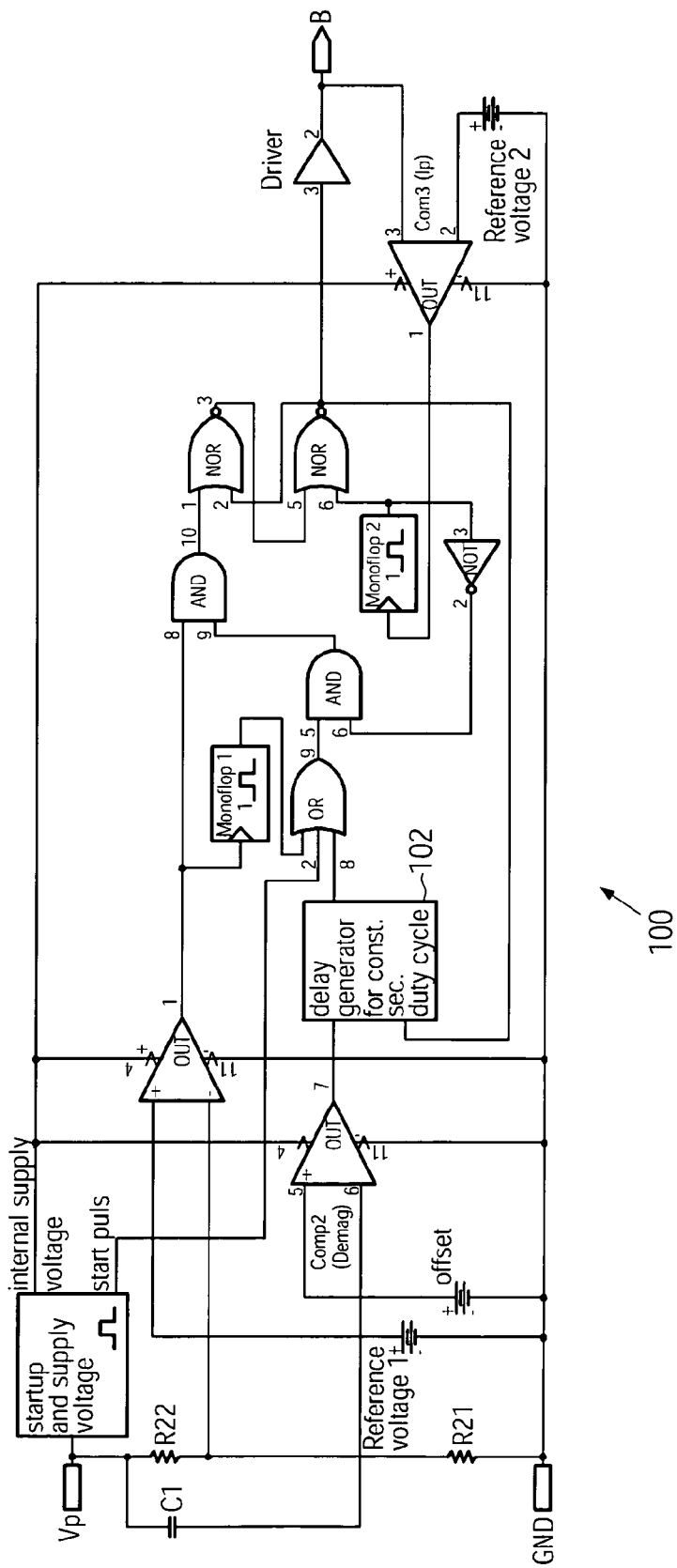
Figure 6:
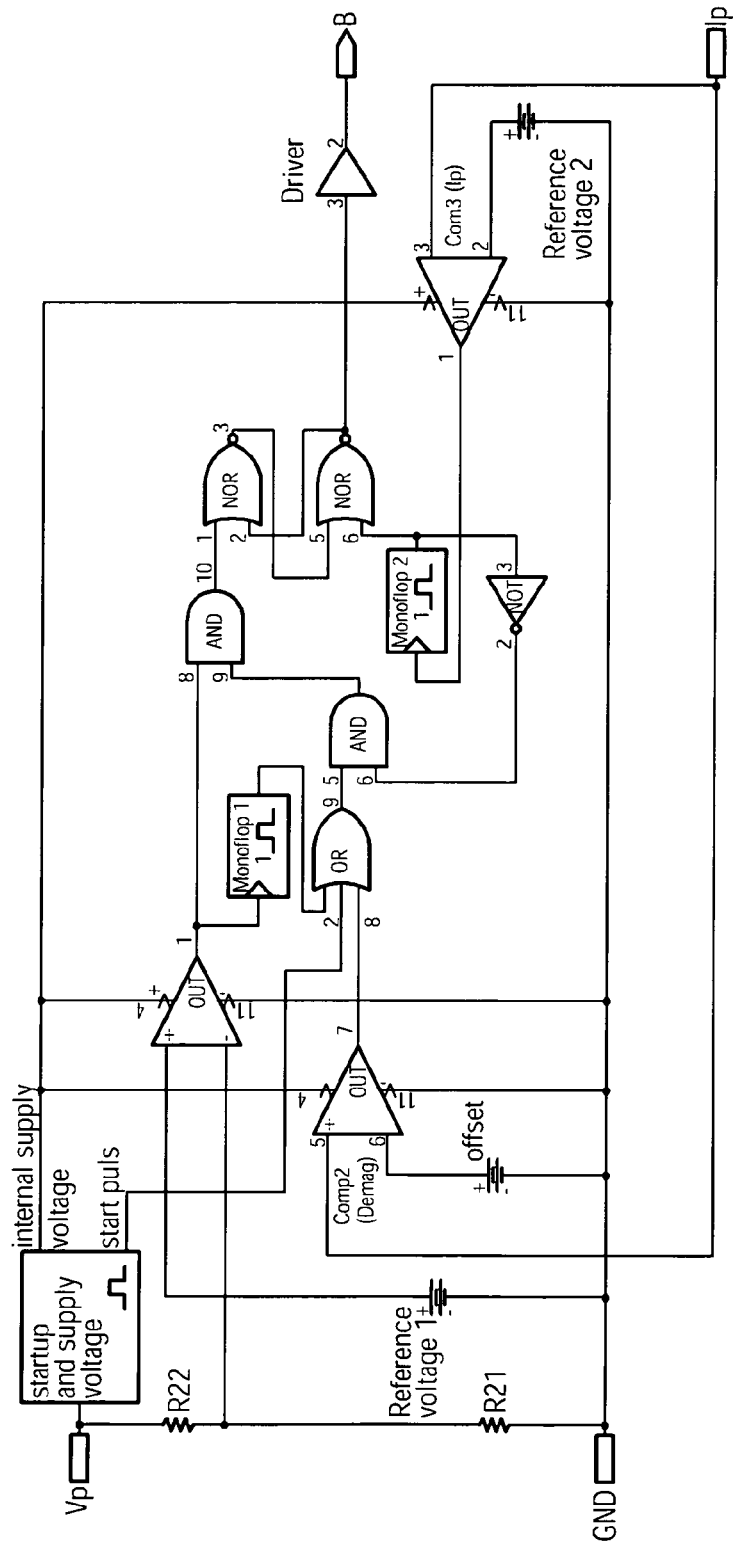
Figure 7:
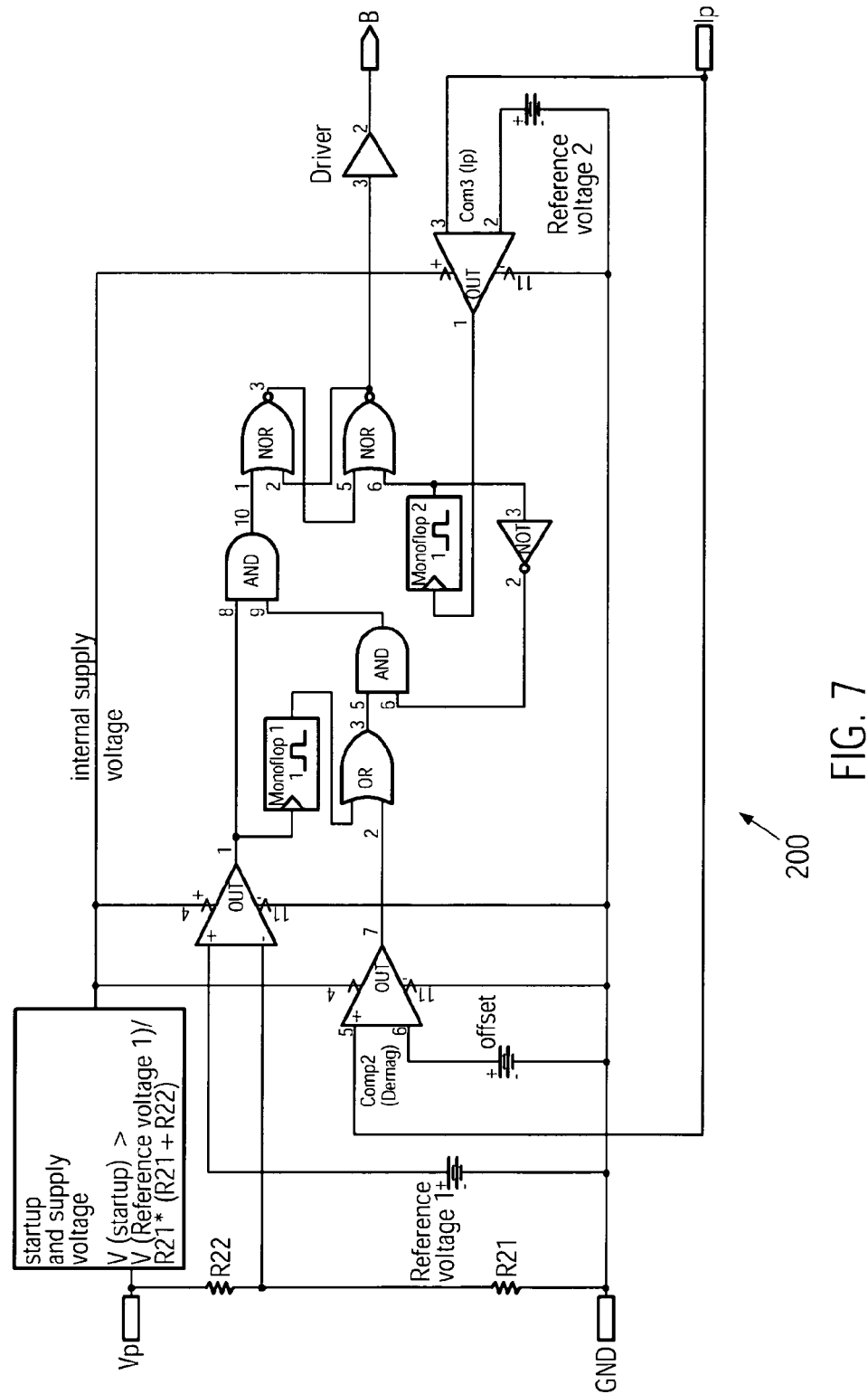
Figure 8:
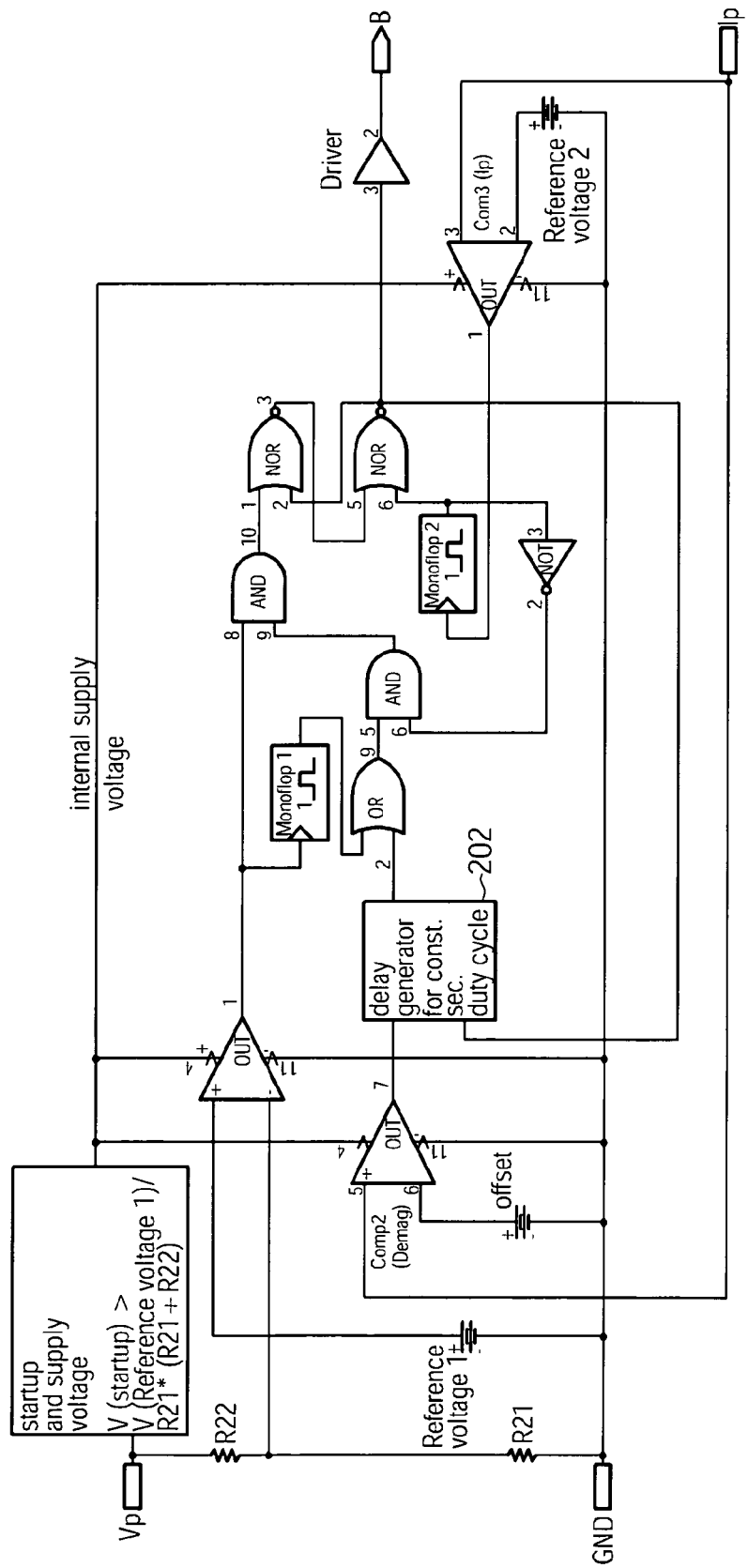
Figure 9:
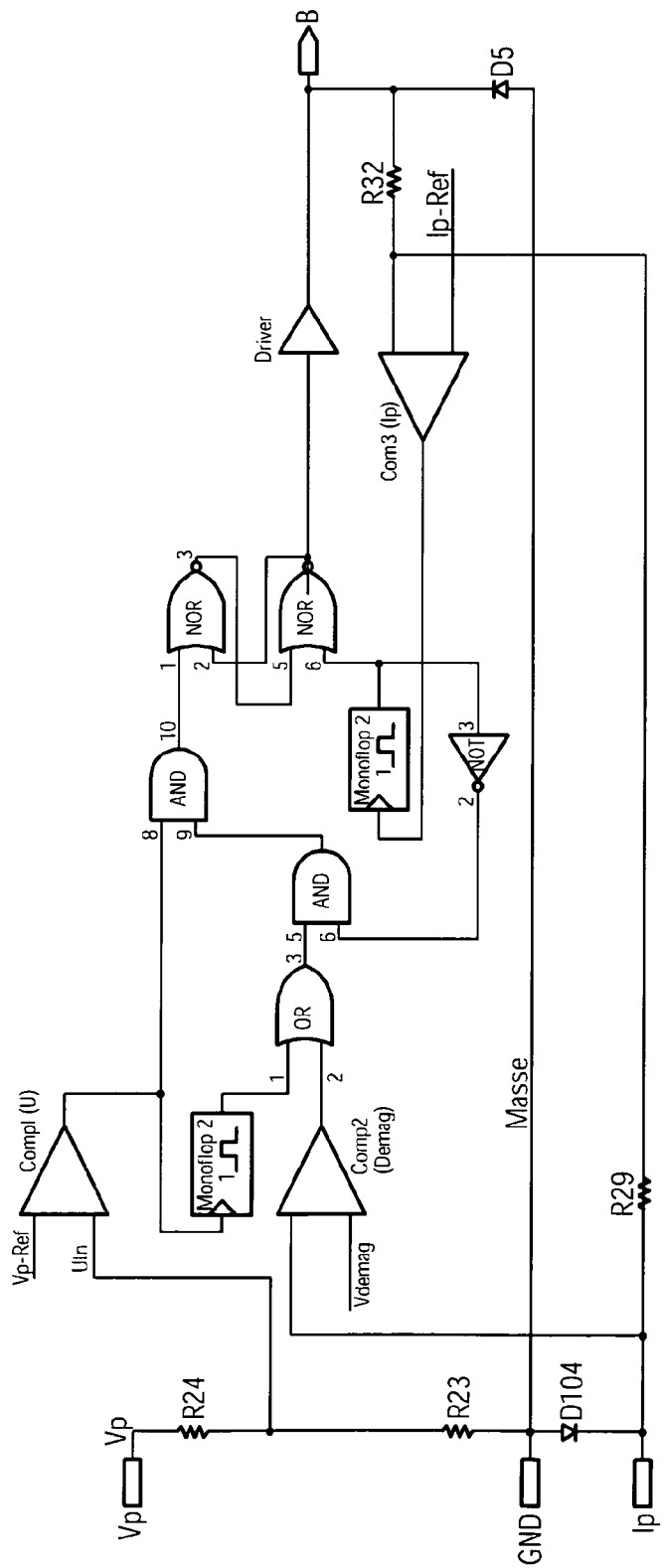
Figure 10:
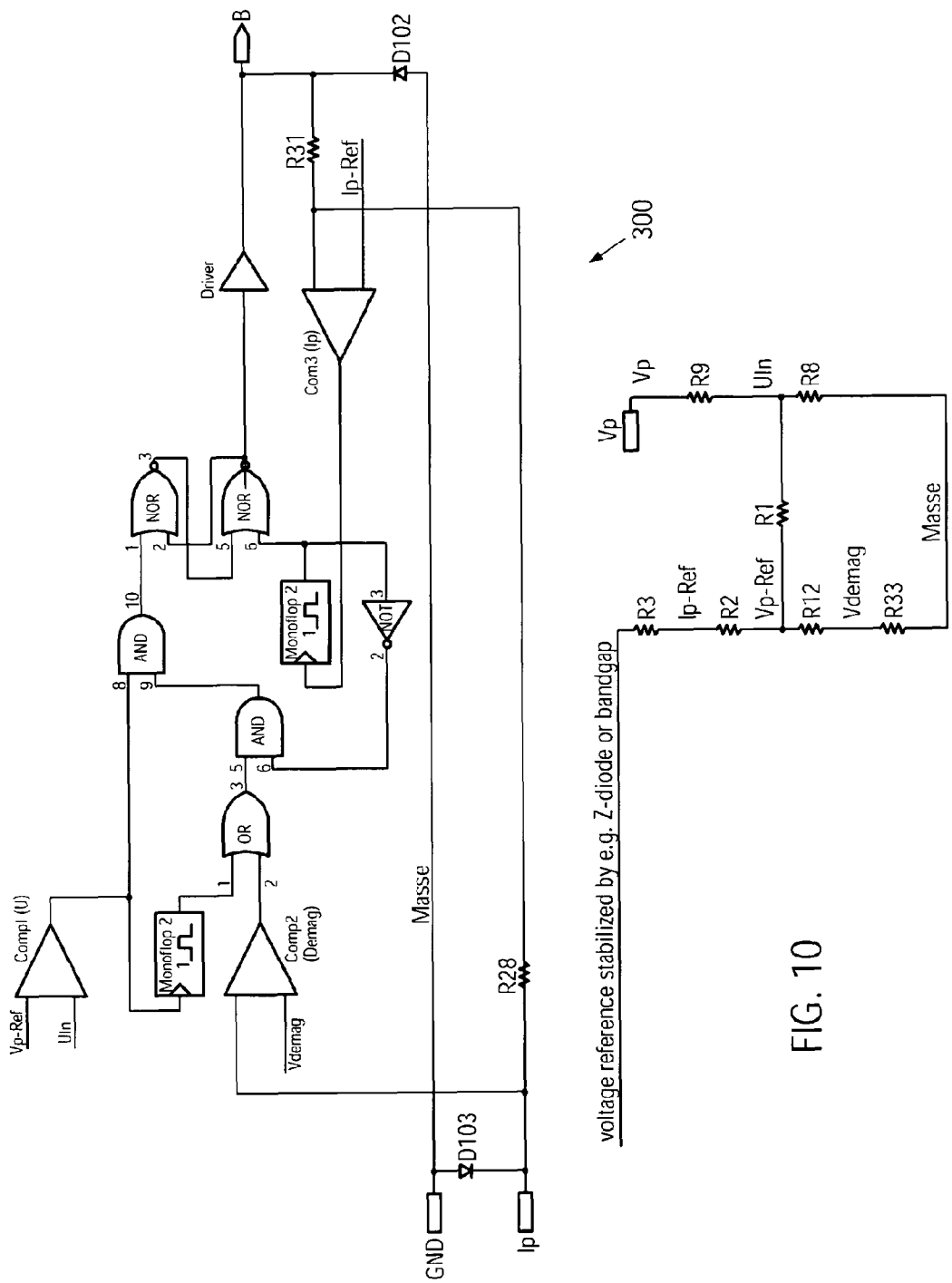
Figure 11:
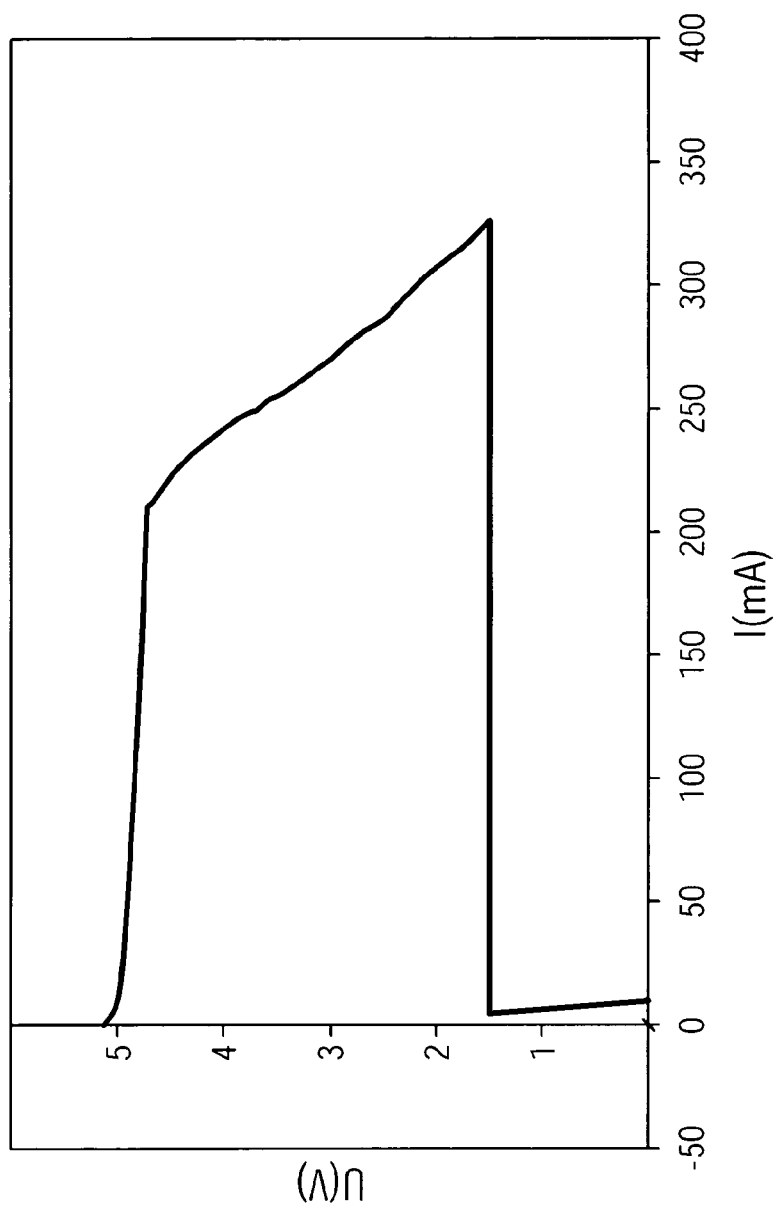
Figure 12:
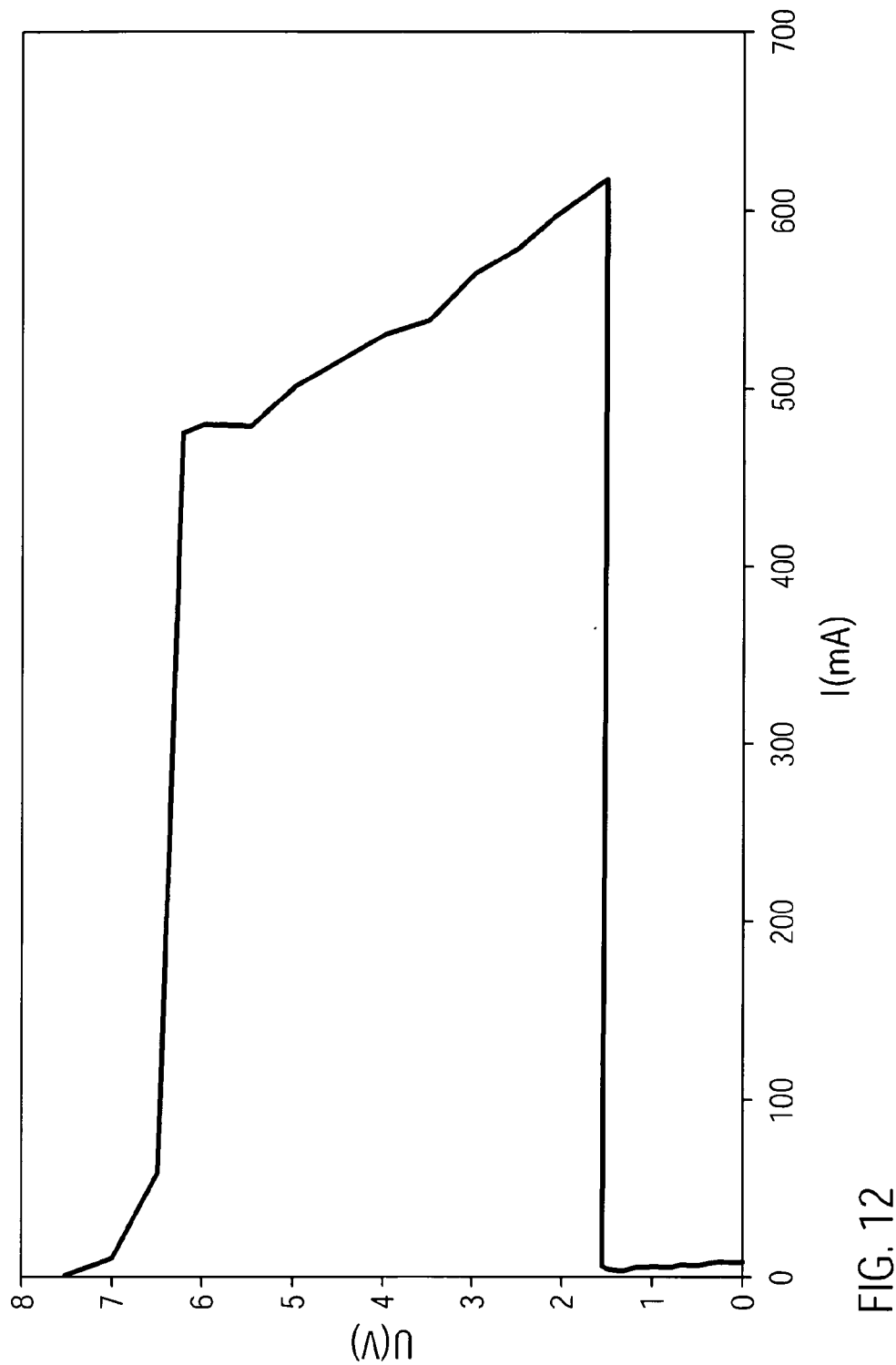
Figure 13:
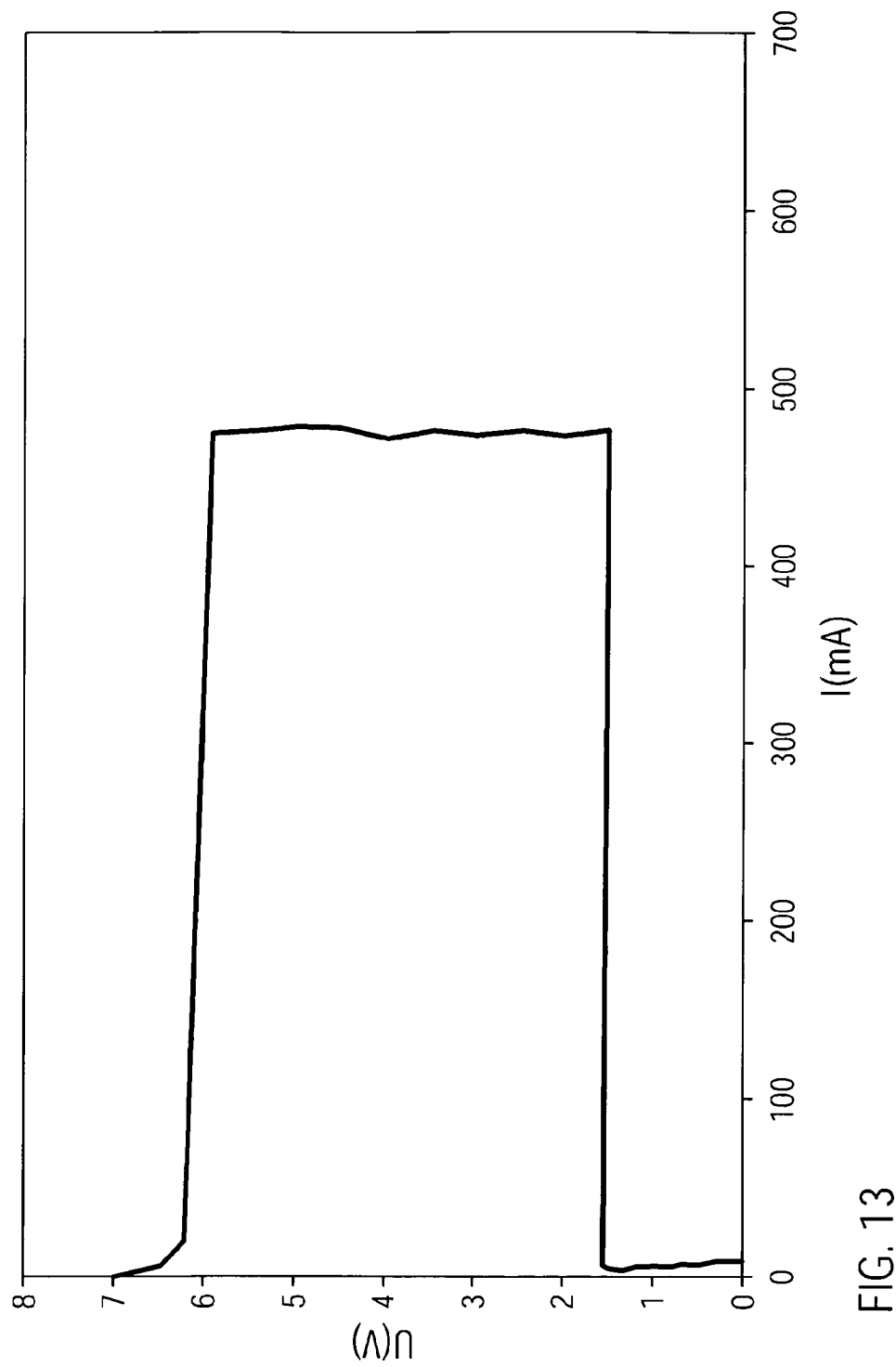
Figure 14:
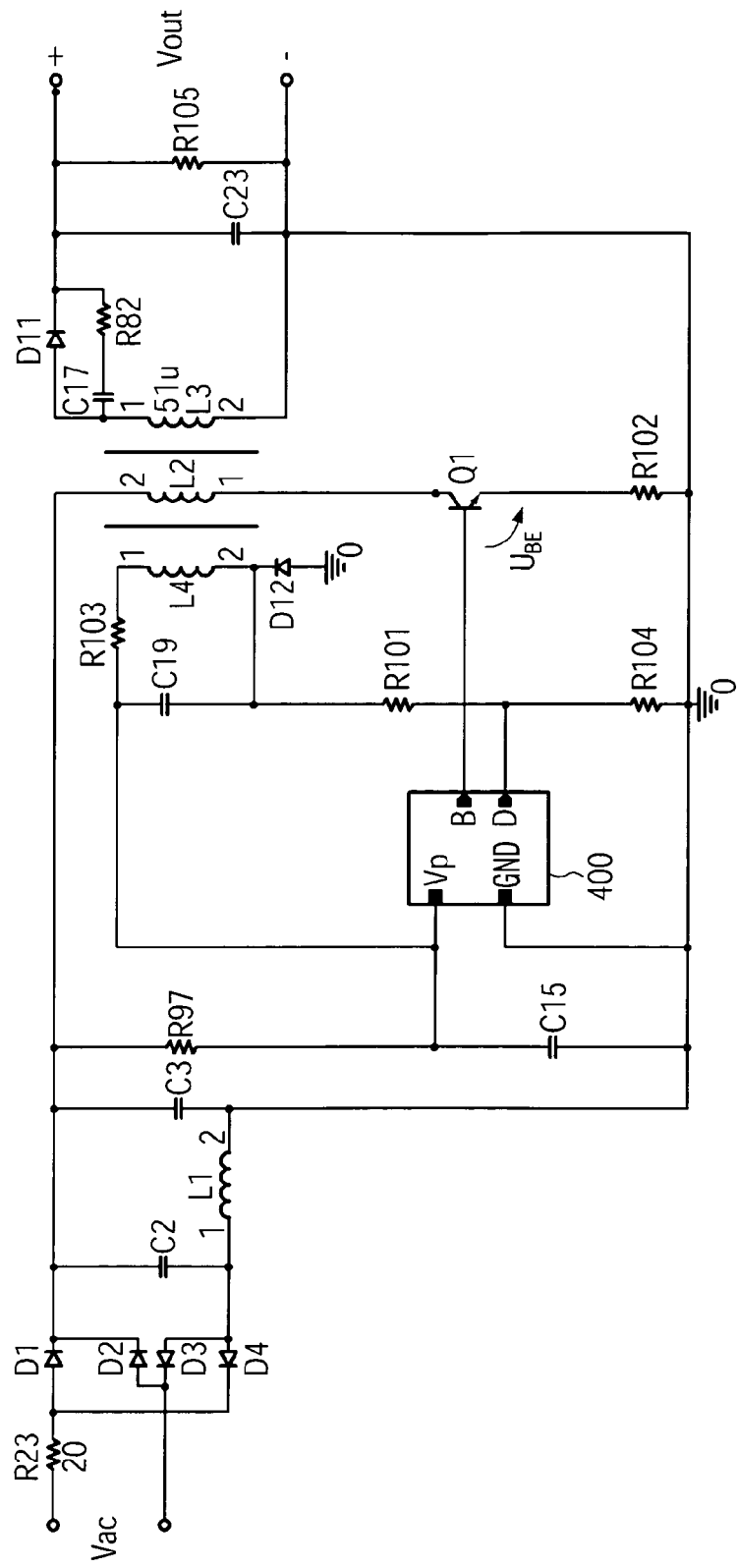
Figure 15:
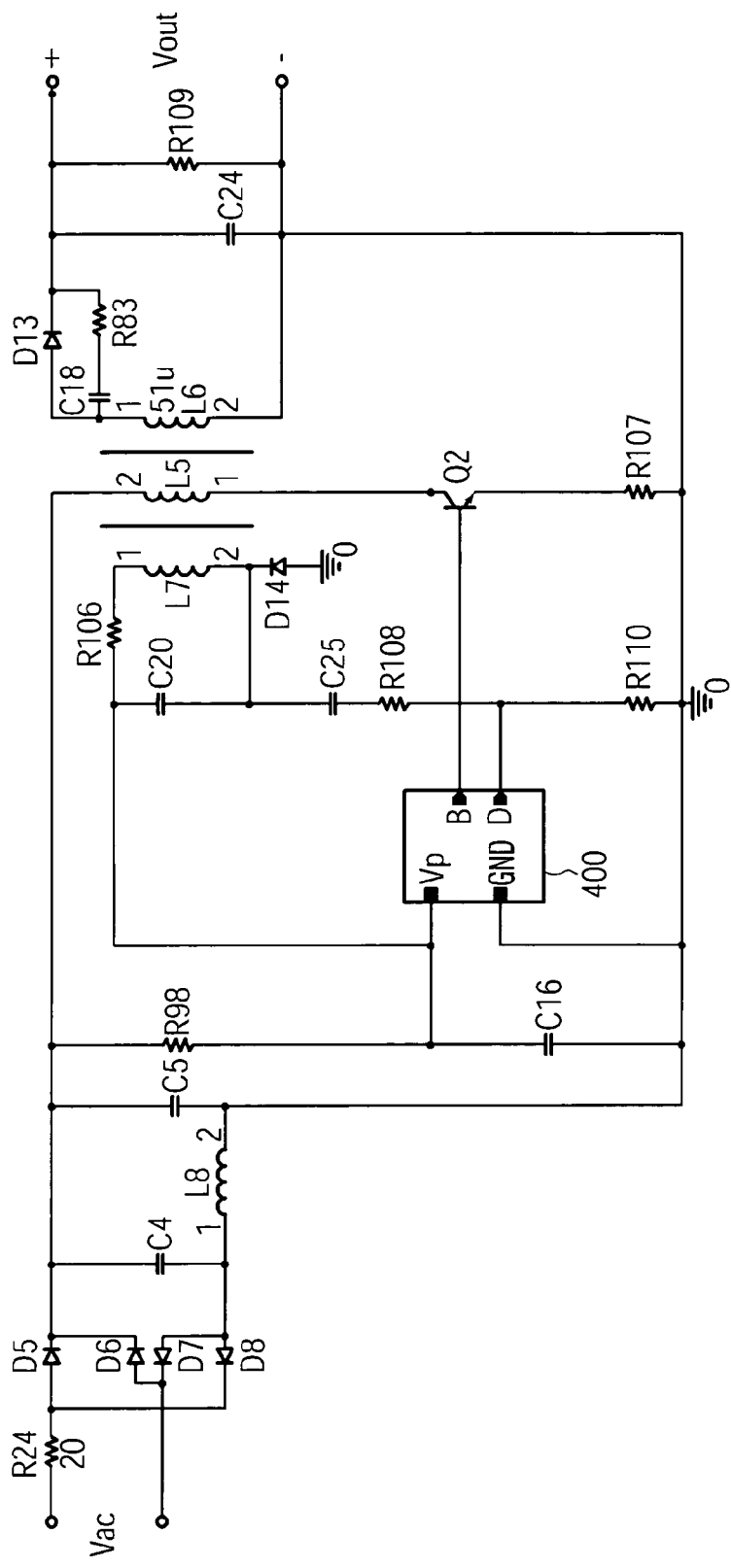
Figure 16:
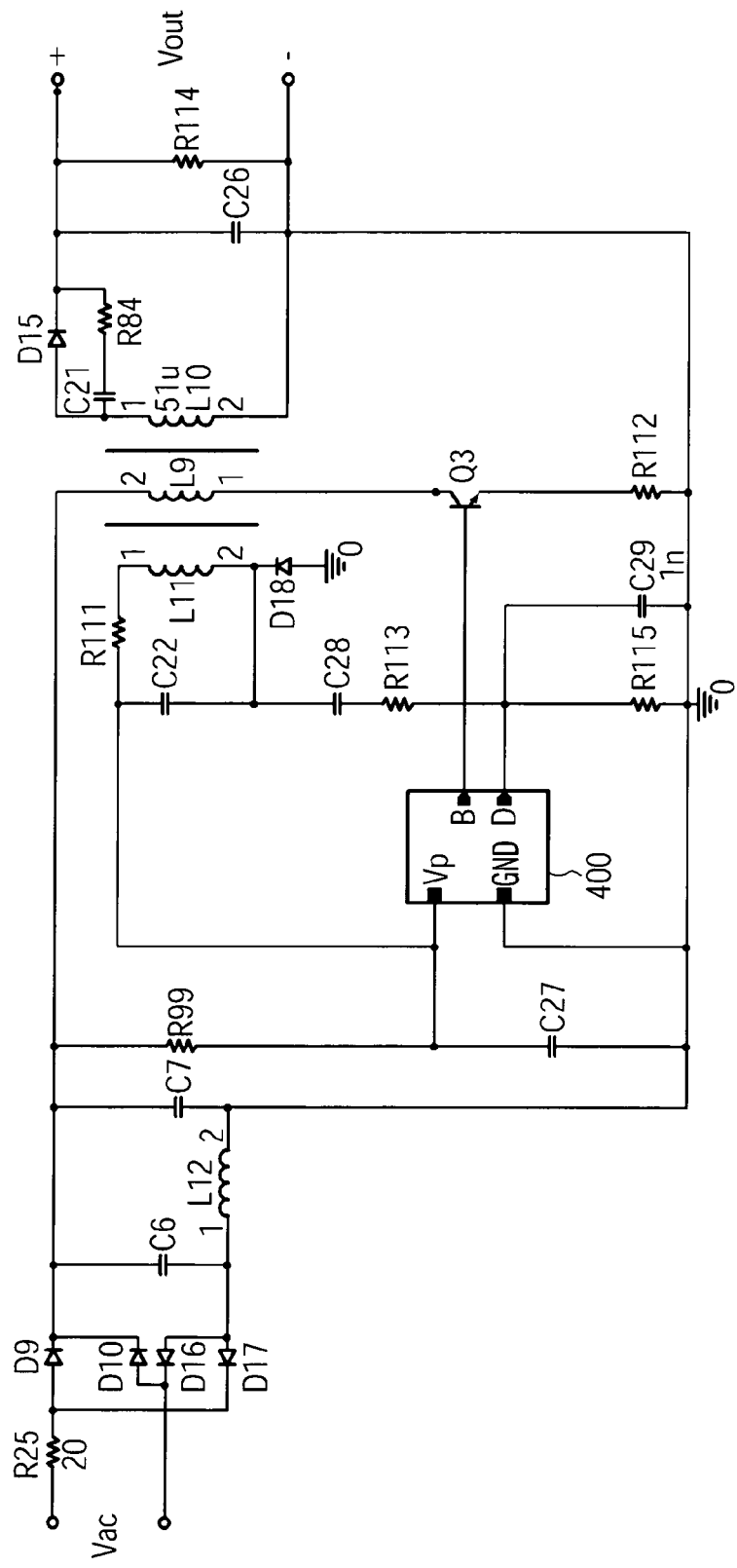
Figure 17:
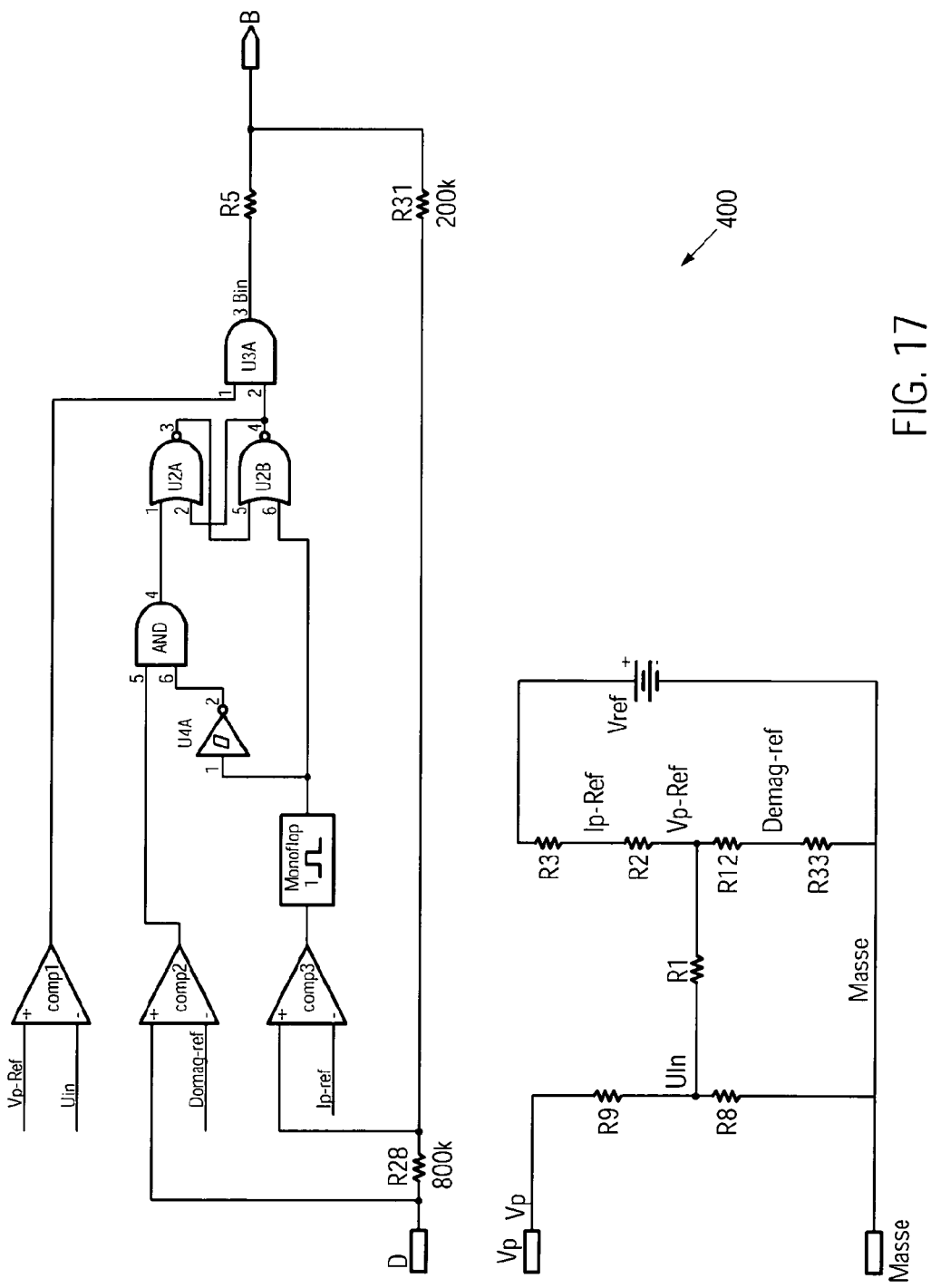
Figure 18:
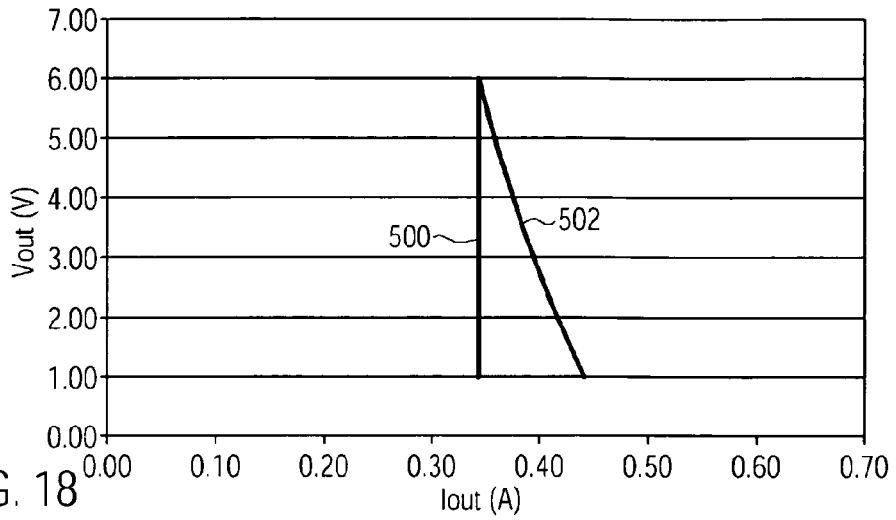
Figure 19:
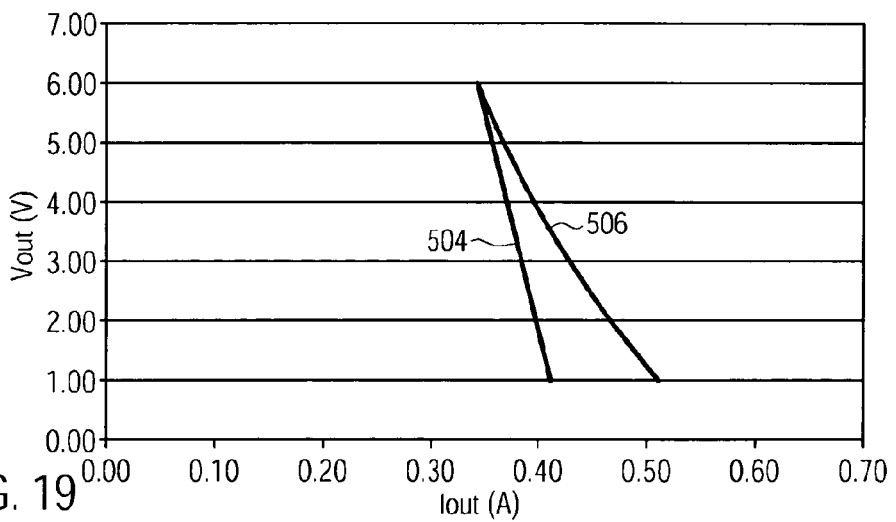
Figure 20:
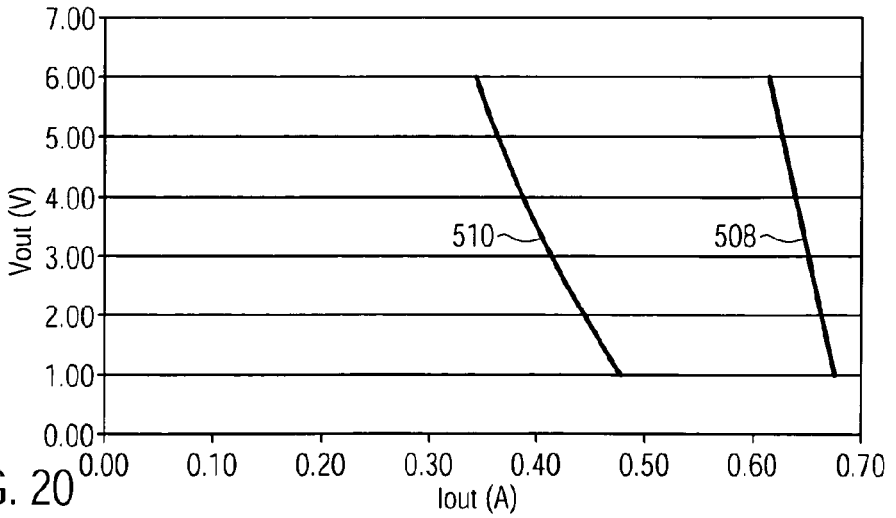

Shown are:

FIG. 1, a block circuit diagram of a primary-triggered switching power supply according to the present invention in a first embodiment, FIG. 2, a block circuit diagram of a primary-triggered switching power supply according to the present invention in a second embodiment, FIG. 3, a block circuit diagram of a primary-triggered switching power supply according to the present invention in a third embodiment, FIG. 4, the trigger circuit from FIG. 1 according to a first embodiment, FIG. 5, a second embodiment of the trigger circuit from FIG. 1, FIG. 6, a first embodiment of the trigger circuit from FIG. 2, FIG. 7, another embodiment of the trigger circuit from FIG. 2, FIG. 8, a third embodiment of the trigger circuit from FIG. 2, FIG. 9, the trigger circuit from FIG. 3 according to a first embodiment, FIG. 10, a second embodiment of the trigger circuit from FIG. 3, FIG. 11, a simulated output characteristic curve for a switching power supply according to FIG. 1 with a trigger circuit according to FIG. 4, FIG. 12, a simulated output characteristic curve for a switching power supply according to FIG. 3 with a trigger circuit according to FIG. 10 at a low input voltage, FIG. 13, a simulated output characteristic curve for a switching power supply according to FIG. 3 with a trigger circuit according to FIG. 10 at a high input voltage, FIG. 14, a block circuit diagram of a primary-triggered switching power supply according to the present invention in another embodiment, FIG. 15, a block circuit diagram of a primary-triggered switching power supply according to the present invention in another embodiment, FIG. 16, a block circuit diagram of a primary-triggered switching power supply according to the present invention in another embodiment, FIG. 17, the trigger circuit from FIGS. 14 to 16, FIG. 18, a calculated output characteristic curve in the current regulated region for a switching power supply with a trigger circuit according to FIG. 17, FIG. 19, a calculated output characteristic curve for a switching power supply without output voltage compensation, FIG. 20, a calculated output characteristic curve for an uncompensated switching power supply.

DETAILED DESCRIPTION OF THE INVENTION

As a block circuit diagram, FIG. 1 schematically shows a switching power supply according to the present invention in a first embodiment. The alternating voltage $AC_{IN}$ is here first rectified by means of the diode bridge circuit D1 to D4 and guided to the primary-side winding L2 of the transformer after corresponding filtering. The primary-side switch Q3 can interrupt the current flow through the primary-side winding L2 in a defined way in response to a trigger signal on its control terminal. The output voltage $V_{out}$ is generated on the secondary-side winding L3 of the transformer.

According to the invention, the trigger circuit 100, which can be fabricated, for example, as an application-specific integrated circuit (ASIC), comprises, in addition to the control terminal that outputs the signal required for triggering the primary-side switch Q3, a ground terminal GND and the operating voltage terminal Vp.

The operating voltage terminal Vp is connected on one side to the input voltage via the resistors R86 and R53 and, on the other side, via the capacitor C21 and the resistor R90, to a primary-side auxiliary winding L4 that feeds back the information via the secondary-side relationships to the trigger circuit 100.

According to the invention, in the 3-pin variant of the trigger circuit 100 shown in FIG. 1, the demagnetization detection is performed directly by means of the operating voltage terminal Vp of the trigger circuit 100. The AC signal required here from the auxiliary winding L4 of the transformer is coupled via the resistor R90 and the capacitor C21 to the operating voltage. So that this is more easily possible, the resistor R86 is inserted. Alternatively, however, the resistors R86 and R90 could also be easily formed only by the parasitic resistors of the capacitors C21 and C15.

The current through the primary-side winding L2 of the transformer is detected indirectly via the voltage drop at the terminal B in the embodiment shown here. The voltage at the terminal B represents the sum of the voltage drop across the resistor R52 and the base-emitter voltage $U_{BE}$ of the switch Q3.

An alternative embodiment of the present invention is shown in FIG. 2. The trigger circuit 200 shown here is installed in a 4-pin housing and features a separate input Ip for the peak current detection. Here, according to the invention, for the demagnetization detection, the AC signal from the auxiliary winding L4 of the transformer is coupled via the capacitor C21 and the resistor R90 onto the signal applied to the terminal Ip. Optionally, this is also possible with only one resistor or one capacitor instead of the RC circuit formed from the elements C21 and R90. The voltage drop across the resistor R52 is used for detecting the current through the winding L2 of the transformer on the terminal Ip.

In FIG. 3, an additional advantageous embodiment of the present invention is shown. The trigger circuit 300 used here is installed in a 4-pin housing, just like the trigger circuit 200 of FIG. 2, and has an input Ip. However, in contrast to the circuit of FIG. 2, first, the external wiring elements are selected differently in part, and second, the input Ip is used for the simultaneous adaptation of the deactivation threshold for the primary peak current as a function of the input voltage and the demagnetization detection. In contrast to the embodiment of FIG. 2, the embodiment of FIG. 3 indeed has the disadvantage that the primary peak current deactivation can be performed only with an accuracy according to the 3-pin variant from FIG. 1, because the actual detection of the primary peak current is performed, as in the 3-pin variant of FIG. 1, on the driver output, the terminal B. The embodiment of FIG. 3, however, has the advantage that the detection of the demagnetization is significantly simplified and, in addition, the output current can be set without additional components so that it is nearly independent of the corresponding input voltage for a fixed output voltage.

In the form of a block circuit diagram, FIG. 4 shows a first embodiment of the trigger circuit 100 from FIG. 1. Essential components of the trigger circuit 100 are the three comparators Comp1 (U), Comp2 (Demag) and Comp3 (Ip). Here, the comparator Comp1 reacts to the voltage on the supply voltage terminal Vp and regulates the output voltage. The comparator Comp2 is similarly connected to the supply voltage terminal according to the invention and performs the demagnetization detection. Finally, the comparator Comp3 is connected to the control output B and detects the current in the transformer in that it detects the sum of the voltages $U_{BE}$ and the voltage on the resistor R52.

As long as the voltage regulation is not active, i.e., as long as the output of the comparator Comp1 is at a low level (LOW), the output is turned on until the transformer current, and hence also the voltage at the terminal B, is so large that the output of the third comparator switches to a high level (HIGH). The signal at output B is then turned off and remains turned off until the energy stored in the transformer is dissipated. At the moment of the complete dissipation of the energy, a voltage drop is generated at the terminal Vp by the wiring of the trigger circuit. This voltage drop is transmitted via the internal capacitor C1 to the second comparator Comp2 and causes the output of the comparator Comp2 to go HIGH. Therefore, the signal B is turned on again.

Thus, the so-called critical conduction mode is produced, i.e., when the current in the transformer becomes zero, it is always immediately turned on again. This operating mode of the switching power supply, also called boundary conduction or transition conduction, has the advantage that the voltage on the switch is minimal during activation, which reduces the activation losses.

The energy in the transformer is built up and dissipated continuously and without pause between zero and a maximum value. From this, a so-called W characteristic curve is produced, i.e., the output current is greater at a low output voltage than at a high output voltage. FIG. 11 shows the simulated characteristic curve profile for this circuit in an output voltage range from zero up to ca. 5 V and an output current intensity from zero to 350 mA.

Another embodiment of the trigger circuit 100 that provides for a constant secondary-side duty factor is illustrated in FIG. 5. In addition to the components of the arrangement shown in FIG. 4, in this embodiment, the trigger circuit 100 has a delay generator 102 that ensures that the output signal of the second comparator Comp2 is delayed so that a constant secondary duty factor is produced. In this way it can be achieved that the output current is independent of the output voltage.

FIGS. 6 to 8 relate to the second embodiment of the trigger circuit 200 that is shown in FIG. 2. In principle, the function of the 4-pin IC is analogous to that of the 3-pin variant.

In particular, the circuit according to FIG. 6 corresponds in function to that from FIG. 4, wherein an additional input Ip is provided for detecting the current through the transformer. According to the invention, the same input is also used for demagnetization detection. The advantage of the realization in a 4-pin housing is primarily to be seen in improved functionality. In particular, the current regulation is significantly more precise. The voltage regulation is also somewhat more precise, because no additional signal need be superimposed on the regulating voltage and a simplified detection of the zero-crossing of the voltage on the winding can be achieved.

FIG. 7 shows, in the form of a simplified circuit diagram, another advantageous embodiment of the trigger circuit 200 with a modified startup. In the embodiments explained above, for starting the trigger circuit, a signal is used that is then generated when the operating voltage has reached a certain level. However, if the so-called startup voltage is higher than the voltage at the terminal Vp at which the first comparator Comp1 switches over, this signal could be completely eliminated, because it is then generated automatically when the voltage falls below the switch-over threshold by the first comparator Comp1 and the monostable trigger circuit 1. The requirement for this function is that the current consumption of the trigger circuit 200 be significantly lower before startup than afterward.

Finally, FIG. 8 shows another advantageous embodiment that is similar in function to the circuit of FIG. 7, in which, however, the output signal of the second comparator Comp2 is delayed, analogously to the circuit of FIG. 5, by a delay generator 202, so that a constant secondary duty factor is produced. Thus, advantageously, the output current of the switching power supply can be made independent of the output voltage.

A first advantageous embodiment of the trigger circuit 300 of FIG. 3 is illustrated in FIG. 9 in the form of a simplified circuit diagram. Here, the comparators Comp1 to Comp3 have a similar function as in the circuit from FIG. 4, wherein the fourth pin is used for the demagnetization detection and simultaneously for the adaptation of the deactivation threshold for the primary peak current as a function of the input voltage. The reference voltages Vp-ref, Vdemag, and Ip-ref are voltage references that are given in the circuit of FIG. 9 as fixed values.

Another embodiment of the trigger circuit 300 that could be used in the switching power supply of FIG. 3 is shown in FIG. 10. Through the use of an Ip threshold dependent on the supply voltage Vp shown here, another improvement of the properties of the trigger circuit 300 is possible. Here, the reference voltages (not shown) could be stabilized, for example, by means of a Zener diode or a band gap reference. In the circuit shown here, when the deactivation threshold for the primary peak current is lower at a lower voltage at the supply voltage terminal Vp corresponding to a lower output voltage than at a higher voltage on Vp, then the output current decreases for a lower output voltage in relation to the current at a higher output voltage. Thus, the output current is less dependent on the output voltage.

The two output characteristic curves of FIGS. 12 and 13 illustrate the properties of the trigger circuit from FIG. 10 that provides a variable Ip reference for different input voltages: FIG. 12 corresponds to an input voltage of 100 V, while FIG. 13 represents the relationships for an input voltage of 375 V. In particular, the output characteristic curve of FIG. 13 shows the essentially constant current profile across a relatively wide output voltage range.

Another embodiment of the trigger circuit 400 according to the invention is described in greater detail below with reference to FIGS. 14 to 20. Here, the essential functions correspond to those of the embodiment from FIG. 10.

FIG. 14 shows a circuit diagram of a switching power supply with a trigger circuit 400 constructed as an ASIC according to the principle presented here. The block circuit diagram of the associated ASIC 400 is illustrated in FIG. 17.

The operating voltage of the ASIC 400 is applied to the pin Vp; this voltage is used in the way described above for regulating the output voltage. Pin B is simultaneously an output and an input, and the transistor Q1 is turned on and off by means of this pin, whereas the pin B is used for detecting the current in the transformer winding L2. The current in L2 flows through the transistor Q1 and the resistor R102. Because the voltage drop $U_{BE}$ across the base-emitter of the transistor Q1 is relatively constant, by measuring the voltage at the pin B, the voltage drop across the resistor R102 can be determined, because the voltage at the pin B in the activated state is higher by the value of the base-emitter voltage $UB_E$ than the voltage at the resistor R102.

The base current of the transistor Q1 in the activated state should be set as constant as possible by the trigger circuit 400, so that it generates a constant offset that can be taken into consideration for the dimensioning of the resistor R102. In FIG. 17, in a simplified representation, the resistor R5 is provided, but a constant current source would be better used instead of the resistor R5.

The temperature dependence of the base-emitter voltage $U_{BE}$ of the transistor equals ca. $-2$ mV K$^{-1}$. This effect can be compensated by a reference voltage in the trigger circuit 400 that similarly has a temperature dependence of $-2$ mV K$^{-1}$. To keep the circuit as simple as possible, however, this was left out in FIG. 17.

By means of the pin D, the demagnetization detection is performed by measuring the voltage on the winding L4 of the transformer. For this purpose, the voltage is divided by means of the two resistors R101 and R104 and compared to a low threshold value Demag-ref. FIGS. 15 and 16 here show additional variants of the connection of pin D.

If the voltage at the pin D falls below the threshold value, then the transformer is demagnetized and the comparator Comp2 enables the activation on the output B.

In addition, the voltage difference between pin D and pin B is divided by means of the resistors R28 and R31 in FIG. 17 (in this example, in the ratio 1/5) and the divided voltage is added to the voltage at the pin B. Because the voltage at the pin D for the activated transistor Q1 in FIG. 14 is negative and proportional to the voltage on the winding L2, the deactivation threshold is reduced for a high input voltage.

Therefore, it is possible, through matched dimensioning of the connection of pin D, to compensate the input voltage-dependent change in current caused by the deactivation delay of the transistor and the signal propagation times of the trigger circuit. In FIG. 14, this takes place through the suitable selection of the values of the resistors R101 and R104.

In the "quasi-resonant mode," for a constant deactivation threshold of the primary current, the output current at a low output voltage is significantly higher than at a high output voltage. This effect could be reduced if the deactivation threshold Ip-ref is made dependent on the voltage on Vp. Thus, if the voltage at the pin Vp is high, which means that the output voltage is high, then the deactivation threshold Ip-ref is higher than when the voltage at Vp is low. One possible embodiment of a trigger circuit 400 that realizes this feature is shown in FIG. 17.

In this circuit, a constant voltage that is stabilized, e.g., by a Z-diode or a band gap is applied to the terminal Vref. The voltage at Vref is stepped down to the required value by means of a voltage divider. A part of the voltage at the pin Vp is superimposed on the divided voltages by means of the resistors R1, R8, and R9.

This has no effect on the voltage regulation, because the resistor R1 is connected between the tapping points for the reference and the measurement values and thus no current flows in the resistor R1 during the voltage regulation, because the regulation sets the measurement value to the same value as the reference. In contrast, during the current regulation, the deactivation threshold Ip-Ref is dependent on the voltage on Vp, which allows the desired effect. In this example, the threshold Demag-ref is also dependent on the voltage on the pin Vp. This is indeed not desired, but also does not represent a significant disadvantage, because the demagnetization detection function also works satisfactorily with a less precise reference.

FIGS. 18 to 20 show comparative calculated output characteristic curves for different input parameters and different trigger circuits. FIG. 18 shows two output characteristic curves in the current regulation region using the trigger circuit of FIG. 17. The curve 500 that was calculated for an input voltage of 264 VAC here lies unchanged at 0.35 A in the entire output voltage range between 1 and 6 V. Thus, at this input voltage, no output voltage dependence of the characteristic curve is to be noted. The curve 502 that was calculated for an input voltage of 90 VAC shows that, at this input voltage, a slight output voltage dependence of the characteristic curve occurs: the output current varies between 0.35 A at 6 V output voltage and 0.45 A at 1 V output voltage.

In comparison, in FIG. 19, the output characteristic curves 504 and 506 are sketched for input voltage values of 264 VAC and 90 VAC, respectively, without the output voltage compensation according to the invention. The curve 504 here varies between 0.35 A and 0.42 A and the curve 506 varies between 0.35 A and 0.52 A in a voltage range from 6 to 1 V.

FIG. 20 finally shows two output characteristic curves of a completely uncompensated switching power supply: the current values at 264 VAC input voltage vary between 0.62 A and 0.68 A (curve 508), while at an input voltage of 90 VAC, the output current values vary between 0.35 A and 0.49 A (curve 510).

Thus, with the aid of the trigger circuits according to the invention, power supply circuits can be built whose losses can be minimized and that simultaneously allow reliable regulation of the output power for a small structural height and at reduced cost.

The invention claimed is:

1. Trigger circuit for a switch in a primary-side, triggered switching power supply, the trigger circuit comprising:
   a supply voltage terminal for supplying the trigger circuit with a supply voltage, wherein the trigger circuit is configured to receive a feedback signal at the supply voltage terminal, the feedback signal being representative of an auxiliary voltage that is induced on an auxiliary winding (L4) of a transformer of the switching power supply, and wherein the feedback signal is superimposed on the supply voltage,
   a control terminal for the output of a trigger signal from the trigger circuit for supply to a control input of the switch,
   a ground terminal for connecting the trigger circuit to a ground potential, and
   a first comparator for comparing the voltage applied to the supply voltage terminal to a first reference voltage.

2. Trigger circuit according to claim 1, wherein the auxiliary winding is able to be coupled to the supply voltage terminal by means of at least one capacitor or at least one resistor.

3. Trigger circuit for a switch in a primary-side, triggered switching power supply, the trigger circuit comprising:
a supply voltage terminal for supplying the trigger circuit with a supply voltage,
a control terminal for the output of a trigger signal from the trigger circuit for supply to a control input of the switch,
a ground terminal for connecting the trigger circuit to a ground potential, and a voltage regulating unit that is configured so that an operating voltage of the trigger circuit is compared to a limit value and the switch is turned off when the operating voltage falls below the limit value,
wherein the trigger circuit is configured to receive a feedback signal at the supply voltage terminal, the feedback signal being representative of an auxiliary voltage that is induced on an auxiliary winding (L4) of a transformer of the switching power supply, and wherein the feedback signal is superimposed on the supply voltage.

4. Trigger circuit according to claim 3, wherein the voltage regulating unit is further configured so that it calculates the zero-crossing of the auxiliary voltage for determining an activation point of the primary-side switch or for calculating a period of current flow.

5. Trigger circuit according to claim 1, further comprising a second comparator for comparing the voltage applied to the supply voltage terminal to a second reference voltage.

6. Trigger circuit according to claim 5, further comprising a third comparator for comparing the voltage applied to the control terminal to a third reference voltage, wherein an output signal of the third comparator is fed back to a driver unit so that the switch is switched off when the voltage at the control terminal reaches the third reference voltage.

7. Trigger circuit according to claim 1, further comprising a startup unit for preparing a start pulse for activating the switching power supply.

8. Trigger circuit for a switch in a primary-side, triggered switching power supply, the trigger circuit comprising:
a supply voltage terminal for supplying the trigger circuit (200, 400) with a supply voltage,
a control terminal for the output of a trigger signal from the trigger circuit for supply to a control input of the switch,
a ground terminal for connecting the trigger circuit to a ground potential, and
a peak current detection terminal for detecting a primary-side peak current,
wherein the trigger circuit is configured to receive a feedback signal at the peak current detection terminal, the feedback signal being representative of an auxiliary voltage that is induced on an auxiliary winding (L4) of a transformer of the switching power supply, and wherein the feedback signal is superimposed on the voltage at the peak current detection terminal.

9. Trigger circuit according to claim 8, further comprising a voltage divider for dividing the voltage difference between the peak current detection terminal and the control terminal, wherein the divided voltage is added to the voltage on the control terminal and used for peak current detection.

10. Trigger circuit according to claim 9, wherein the voltage divider divides the voltage difference between the peak current detection terminal and the control terminal at the ratio 1/5.

11. Trigger circuit according to claim 8, wherein the side auxiliary winding is able to couple to the peak current detection terminal by means of at least one capacitor or one resistor.

12. Trigger circuit according to claim 8, further comprising a voltage regulating unit that is configured so that an operating voltage of the trigger circuit is compared to a limit value and the switch is turned off when the operating voltage falls below the limit value.

13. Trigger circuit according to claim 8, wherein the trigger circuit is further configured so that it detects the zero-crossing of the auxiliary voltage for determining an activation time of the primary-side switch or for calculating a period of current flow.

14. Trigger circuit according to claim 8, further comprising a first comparator for comparing the voltage that is applied to the supply voltage terminal to a first reference voltage.

15. Trigger circuit according to claim 14, further comprising a second comparator for comparing the voltage that is applied to the peak current detection terminal to a second reference voltage.

16. Trigger circuit according to claim 15, further comprising a third comparator for comparing the voltage that is applied to the peak current detection terminal to a third reference voltage, wherein an output signal of the third comparator is fed back to a driver unit so that the switch is switched off when the voltage at the peak current detection terminal reaches the third reference voltage.

17. Trigger circuit according to claim 15, further comprising a third comparator for comparing the voltage that is applied to the control terminal to a third reference voltage, wherein an output signal of the third comparator is fed back to a driver unit so that the switch is switched off when the voltage at the control terminal reaches the third reference voltage.

18. Trigger circuit according to claim 17, further comprising a reference voltage generation circuit that is connected to the supply voltage input for generating at least one of the first, second, and third reference voltages as a function of the supply voltage.

19. Trigger circuit according to claim 8, further comprising a startup unit for preparing a start pulse when the switching power supply is turned on.

20. Primary-side, triggered switching power supply comprising:
a transformer with a primary-side main winding and a secondary-side main winding, wherein electrical energy pulses are transmitted from the primary-side main winding to the secondary-side main winding,
a primary-side switch for turning on and off a primary current through the primary-side main winding in response to a trigger signal,
an auxiliary winding in which a voltage pulse is induced after the primary-side switch is turned off, and
a primary-side trigger circuit comprising:
a supply voltage terminal for supplying the trigger circuit with a supply voltage, wherein the trigger circuit is configured to receive a feedback signal at the supply voltage terminal, the feedback signal being representative of the voltage pulse that is induced on the auxiliary winding, and wherein the feedback signal is superimposed on the supply voltage,
a control terminal for the output of the trigger signal from the trigger circuit for supply to a control input of the primary-side switch,
a ground terminal for connecting the trigger circuit to a ground potential, and
a first comparator for comparing the voltage applied to the supply voltage terminal to a first reference voltage.

21. Primary-side, triggered switching power supply comprising:

a transformer with a primary-side main winding and a secondary-side (L3) main winding, wherein electrical energy pulses are transmitted from the primary-side main winding to the secondary-side main winding, a primary-side switch for turning on and off a primary current through the primary-side main winding in response to a trigger signal, an auxiliary winding in which a voltage pulse is induced after the primary-side switch is turned off, and a primary-side trigger circuit comprising:
- a supply voltage terminal for supplying the trigger circuit with a supply voltage,
- a control terminal for the output of the trigger signal from the trigger circuit for supply to a control input of the primary-side switch,
- a ground terminal for connecting the trigger circuit to a ground potential, and
- a peak current detection terminal for detecting a primary-side peak current, wherein the trigger circuit is configured to receive a feedback signal at the peak current detection terminal, the feedback signal being representative of the voltage pulse that is induced on the auxiliary winding, and wherein the feedback signal is superimposed on the voltage at the peak current detection terminal.

* * * * *